(12) United States Patent
Trentel

(10) Patent No.: US 11,867,981 B1
(45) Date of Patent: Jan. 9, 2024

(54) SYSTEMS, METHODS, AND DEVICES FOR MODULAR EYEWEAR

(71) Applicant: Maurice Matthew Trentel, Mableton, GA (US)

(72) Inventor: Maurice Matthew Trentel, Mableton, GA (US)

(*) Notice: Subject to any disclaimer, the term of this patent is extended or adjusted under 35 U.S.C. 154(b) by 0 days.

(21) Appl. No.: 18/317,546

(22) Filed: May 15, 2023

Related U.S. Application Data

(63) Continuation of application No. 18/175,022, filed on Feb. 27, 2023.

(51) Int. Cl.
| | |
|---|---|
| G02C 5/00 | (2006.01) |
| G02C 7/08 | (2006.01) |
| G02C 11/00 | (2006.01) |
| G02C 11/04 | (2006.01) |
| G02C 5/20 | (2006.01) |

(52) U.S. Cl.
CPC .............. *G02C 5/006* (2013.01); *G02C 5/008* (2013.01); *G02C 5/20* (2013.01); *G02C 7/088* (2013.01); *G02C 11/04* (2013.01); *G02C 11/10* (2013.01); *G02C 2200/02* (2013.01); *G02C 2200/08* (2013.01)

(58) Field of Classification Search
CPC .......... G02C 5/006; G02C 5/008; G02C 5/20; G02C 7/088; G02C 11/04; G02C 11/10; G02C 2200/02; G02C 2200/08
USPC ..................................................... 351/41, 63
See application file for complete search history.

(56) References Cited

U.S. PATENT DOCUMENTS

| | | | | |
|---|---|---|---|---|
| 5,007,728 A | * | 4/1991 | Magorien | G02C 5/146 351/119 |
| 5,059,017 A | * | 10/1991 | Bennato | G02C 5/006 351/153 |
| 5,583,588 A | * | 12/1996 | Chao | G02C 5/2254 351/153 |
| 7,931,366 B1 | | 4/2011 | Lando | |
| 8,465,151 B2 | * | 6/2013 | Howell | G02C 5/143 351/158 |
| 9,448,420 B2 | * | 9/2016 | Tormen | G02C 5/146 |
| 9,766,479 B2 | * | 9/2017 | Healy | G02C 1/06 |
| 10,948,747 B2 | * | 3/2021 | Groenewege | G02C 11/00 |
| 11,106,054 B2 | | 8/2021 | Maglione | |
| 11,409,135 B1 | | 8/2022 | Gordon et al. | |
| 2008/0105798 A1 | | 5/2008 | Jongebloed | |
| 2012/0019770 A1 | | 1/2012 | DiChiara | |

* cited by examiner

*Primary Examiner* — Tuyen Tra
(74) *Attorney, Agent, or Firm* — Meunier Carlin & Curfman LLC

(57) ABSTRACT

An exemplary system, method, and device are disclosed that facilitate a modular eyewear system with modular components (e.g., lenses, frames, speakers, cameras, lights, etc.) that can be interchanged. The modular components can be interchanged using components that are reversibly attachable/releasable (e.g., magnets at both male-female connectors). This can allow a wearer of the eyewear to quickly reconfigure the eyewear for different purposes, readjust the fit of the eyewear, repair damage to the eyewear, and/or customize the appearance of the eyewear.

25 Claims, 15 Drawing Sheets

600

| Provide a first lens, a first bendable section attachably and releasably connected to the lens, and a first frame section attachably and releasably connected to the bendable section |
| --- |
| 602 |

| Releasing the first lens from the first bendable section |
| --- |
| 604 |

| Attaching a second lens to the first bendable section |
| --- |
| 606 |

Providing a first lens, a first bendable section attachably and releasably connected to the lens; and a first frame section attachably and releasably connected to the bendable section
632

Determining a desired position of the first lens and first frame section relative to a body part of the person
634

Bending the first bendable section so that the first lens and the first frame section are in the desired position relative to the body part of the person.
636

*FIG. 6B*

SYSTEMS, METHODS, AND DEVICES FOR MODULAR EYEWEAR

BACKGROUND

Eyewear can include any devices worn on or around a person's eye. Eyewear can have many different purposes, including any combination of safety, fashion, vision correction, display, and utility. Eyewear can be made from a variety of different materials and further specialized into eyewear for specific jobs or purposes. Eyewear can include lenses configured to modify light passing in front of a wearer's eyes and/or to protect a wearer's eyes. Some lenses used in eyewear are corrective lenses that can be configured to remedy or improve a wearer's eyesight. Other examples of features that can be incorporated into lenses include polarizing filters, UV filters, ballistic impact-resistant materials, and filters to reduce incoming light.

Different types of eyewear can have different combinations of benefits. For example, safety-specific eyewear like safety glasses or goggles may not be fashionable. Or, as another example, eyewear that is fashionable or designed for safety may lack vision correction or utility features.

SUMMARY

An exemplary system, method, and device are disclosed that facilitate a modular eyewear system with modular components (e.g., lenses, frames, speakers, cameras, lights, etc.) that can be interchanged. The modular components can be interchanged using components that are reversibly attachable/releasable (e.g., magnets at both male-female connectors). This can allow a wearer of the eyewear to quickly reconfigure the eyewear for different purposes, readjust the fit of the eyewear, repair damage to the eyewear, and/or customize the appearance of the eyewear.

In an aspect, a modular eyewear system is disclosed, the system comprising a first lens section (e.g., lens frame+lens) having a first end, wherein the first lens section includes, at a second end, a second lens or a second lens section having the second lens; and a first temple frame section designed to extend along a temple and side of a person face to have a terminated end to rest along an ear region of the person, the first temple frame section having a first adjustable section at its first end to attachably and releasably couple to the first end of the first lens section, the first adjustable section having a multiple-collapsible or bendable structure configured to move between a plurality of configurations, including (i) a first configuration that rests the terminated end along a first ear region of the person and (ii) a second configuration that rests the terminated end along a second ear region.

In some embodiments, the multiple-collapsible or bendable structure of the first adjustable section forms a parallel-folds-accordion structure.

In some embodiments, the multiple-collapsible or bendable structure of the first adjustable section forms a bendable structure.

In some embodiments, the multiple-collapsible or bendable structure is configured as a male connector or female connector to attachably and releasably couple to a corresponding pair connector located on the first end of the first lens section.

In some embodiments, the male connector comprises a rubberized magnetic rod, and the female connector comprises a slot sized to receive the rubberized magnetic rod.

In some embodiments, the male connector comprises a magnetic rod, and the female connector comprises a slot sized to receive the magnetic rod.

In some embodiments, the multiple-collapsible or bendable structure of the first adjustable section is formed of a pliable material.

In some embodiments, the first adjustable section comprises one or more magnets.

In some embodiments, the system further includes a second temple frame section designed to extend along the other temple and side of the person's face to have a second terminated end to rest along an ear region of the second ear of the person, the second temple frame section having a second adjustable section at its first end to attachably and releasably coupled to the second end of the first lens section, wherein the second end of the first lens section includes the second lens and associated frame, wherein the second adjustable section has a multiple-collapsible or bendable structure configured to move between a plurality of configurations, including (i) a third configuration that rests the second terminated end along a first ear region at the second ear of the person and (ii) a fourth configuration that rests the second terminated end along a second ear region at the second ear of the person.

In some embodiments, the system further includes a second temple frame section designed to extend along the other temple and side of the person's face to have a second terminated end to rest along an ear region of the second ear of the person, the second temple frame section having a second adjustable section at its first end to attachably and releasably couple to a first end of a second lens section, wherein the second lens section includes the second lens and associated frame, wherein the second adjustable section has a multiple collapsible or bendable connection configured to move between a plurality of configurations, including (i) a third configuration that rests the second terminated end along a first ear region at the second ear of the person and (ii) a fourth configuration that rests the second terminated end along a second ear region at the second ear of the person.

In some embodiments, the first lens section and the second lens section include a corresponding pair of multiple collapsible or bendable connections.

In some embodiments, a first optical property of the first lens is different than a second optical property of the second lens.

In some embodiments, the first temple frame section and the second temple section have a same mass though different in color or shape.

In some embodiments, the first lens further comprises a first lens frame and the second lens further comprises a second lens frame, wherein the first lens frame and the second lens frame are different.

In some embodiments, the first temple frame section comprises a sensor, an earbud, a speaker, an LED light, and/or a communications module.

In some embodiments, the system further includes the second lens section (e.g., lens frame+lens) having a first end, wherein the second lens section comprises a frame for the second lens, and wherein the second lens section includes a connector to couple to the first lens section at the nose bridge.

In another aspect, a method of operating a modular eyewear system is disclosed, the method comprising: providing (i) a first lens section (e.g., lens frame+lens) having a first end, wherein the first lens section includes, at a second end, a second lens or a second lens section having the second lens and (ii) a first temple frame section connected to the first lens section and is designed to extend along a temple and side of a person face to have a terminated end to rest along an ear region of the person, the first temple frame section having a first adjustable section at its first end to attachably and releasably couple to the first end of the first lens section, the first adjustable section having a multiple-collapsible or bendable structure configured to move between a plurality of configurations, including (i) a first configuration that rests the terminated end along a first ear region of the person and (ii) a second configuration that rests the terminated end along a second ear region; releasing the first lens section, at its first end, from the first temple frame section; and attaching the first lens section, at its first end, to a third temple frame section, wherein the third temple frame section is designed to extend along a temple and side of a person face to have a terminated end to rest along an ear region of the person, the third temple frame section having a third adjustable section at its first end to attachably and releasably couple to the first end of the first lens section, the third adjustable section having a multiple-collapsible or bendable structure configured to move between a plurality of configurations, including (i) a first configuration that rests the terminated end along a first ear region of the person and (ii) a second configuration that rests the terminated end along a second ear region.

In another aspect, a method of fitting a modular eyewear system to a person is disclosed, the method comprising: providing (i) a first lens section (e.g., lens frame+lens) having a first end, wherein the first lens section includes, at a second end, a second lens or a second lens section having the second lens and (ii) a first temple frame section connected to the first lens section and is designed to extend along a temple and side of a person face to have a terminated end to rest along an ear region of the person, the first temple frame section having a first adjustable section at its first end to attachably and releasably couple to the first end of the first lens section, the first adjustable section having a multiple-collapsible or bendable structure configured to move between a plurality of configurations, including (i) a first configuration that rests the terminated end along a first ear region of the person and (ii) a second configuration that rests the terminated end along a second ear region; determining a desired position of the first lens section and the first temple frame section relative to a nose region and the first ear region of the person; and adjusting the first adjustable section at the multiple-collapsible or bendable structure to the desired position relative to the body part of the person.

In another aspect, a modular eyewear system is disclosed, the system comprising: a first lens section (e.g., lens frame+lens) having a first end, wherein the first lens section includes, at a second end, a second lens or a second lens section having the second lens; and a first temple frame section designed to extend along a temple and side of a person face to have a terminated end to rest along an ear region of the person, the first temple frame section having a connection assembly at its first end to attachably and releasably couple to the first end of the first lens section. The modular eyewear with the connection assembly may be configured with any of the above-discussed features.

Other aspects and features, according to the example embodiments of the disclosed technology, will become apparent to those of ordinary skill in the art upon reviewing the following detailed description in conjunction with the accompanying figures.

BRIEF DESCRIPTION OF THE DRAWINGS

The accompanying drawings, which are incorporated in and constitute a part of this specification, illustrate embodiments and together with the description, serve to explain the principles of the devices and methods.

FIGS. 6A and 6B each illustrates an example method of operating a modular eyewear system.

DETAILED DESCRIPTION

Figure 1A:
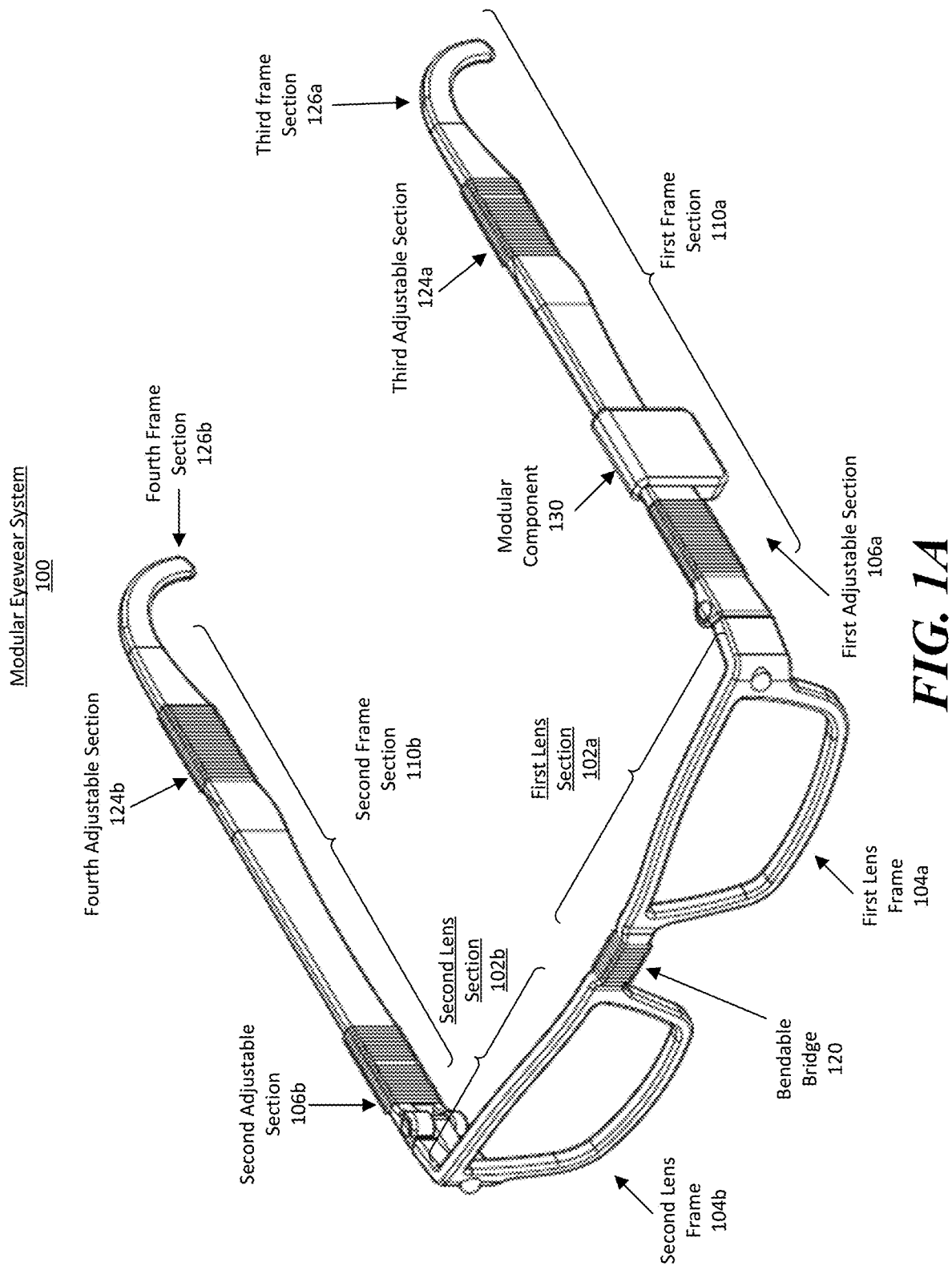
FIG. 1A is a diagram showing a perspective view of an example modular eyewear system with a releasably connecting bridge and including a removable component, in accordance with an illustrative embodiment.

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

As discussed above, exemplary systems, methods, and devices are disclosed that facilitate an eyewear system having modular components, e.g., the lenses, frames, and other components that can be interchanged. The modular components can be interchanged using components that are reversibly attachable/releasable (e.g., magnets or male-female connectors). This can allow a wearer of the eyewear to quickly reconfigure the eyewear for different purposes, repair damage to the eyewear, and/or customize the appearance of the eyewear.

Different modular eyewear components can be attached to and removed from the modular eyewear system to configure the modular eyewear system to have different attributes, visual appeal, or aesthetics.

In the following description, references are made to the accompanying drawings that form a part hereof and that show, by way of illustration, specific embodiments or examples. In referring to the drawings, like numerals represent like elements throughout several figures.

Example System #1

Figure 1B:
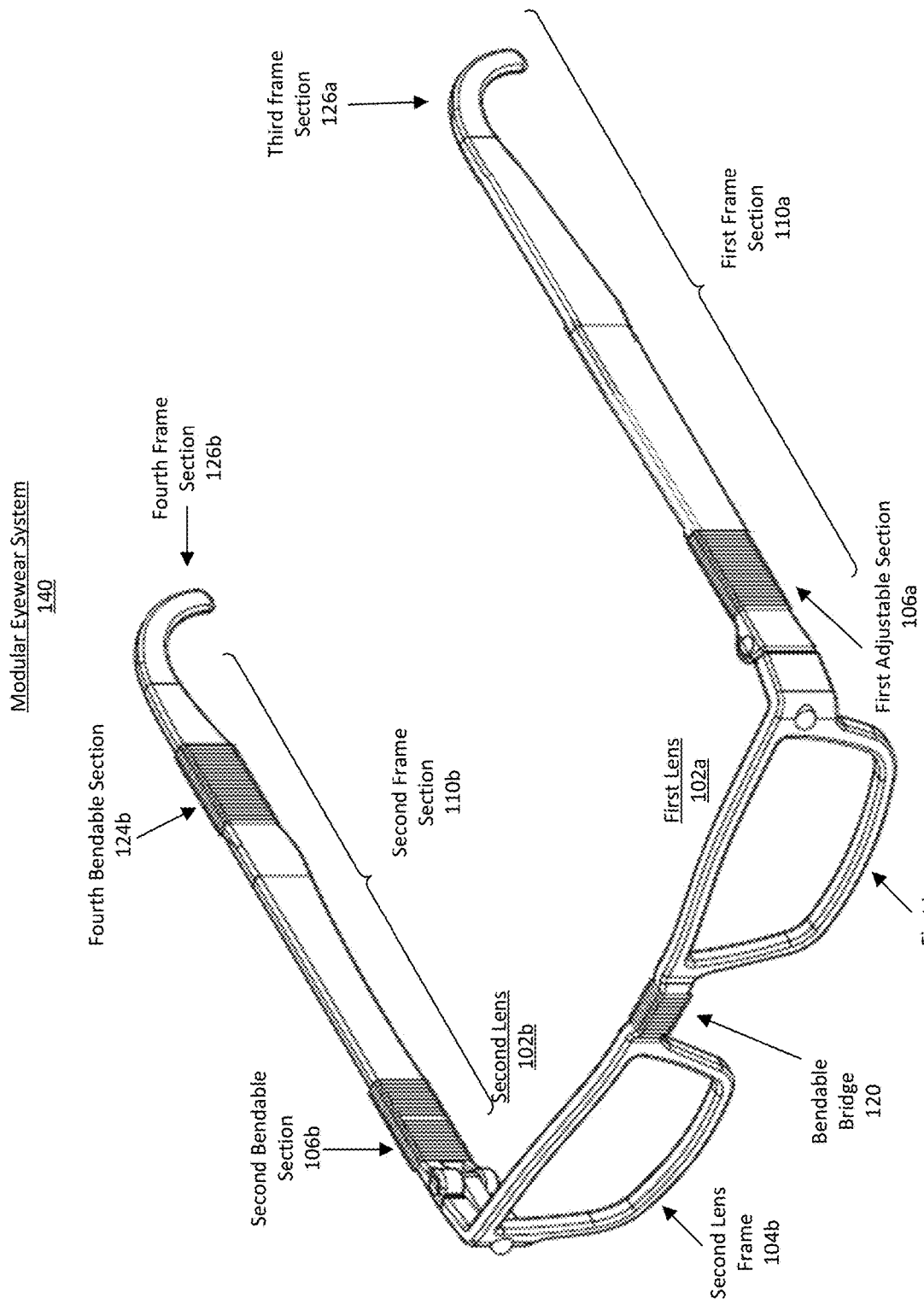
FIG. 1B is a diagram showing a perspective view of an example modular eyewear system with a bendable bridge in accordance with an illustrative embodiment.
Figure 1C:
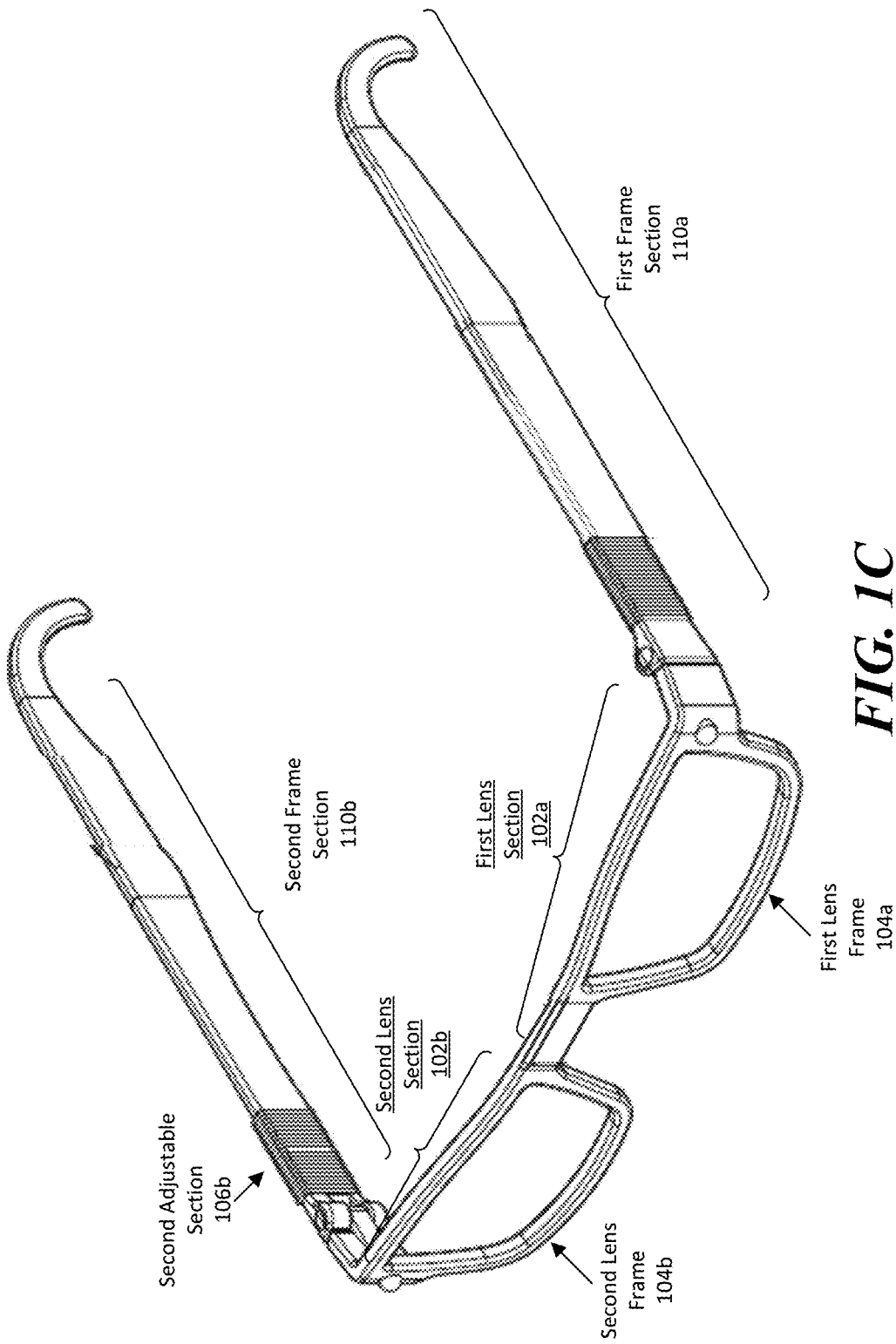
FIG. 1C is a diagram showing a perspective view of an example modular eyewear system in accordance with an illustrative embodiment.

FIGS. 1A, 1B, and 1C show perspective views of various configurations of an exemplary modular eyewear system in accordance with an illustrative embodiment.

FIG. 1A is a diagram showing a perspective view of an example modular eyewear system 100. The example modular eyewear system 100 includes a first lens section 102a that can be attached to a first frame section 110a having a first adjustable section 106a. The first adjustable section 106a can serve as a point of connection between the first frame section 110a and the first lens frame 104a and can be configured so that the first lens section 102a and first frame section 110a can be reversibly attached/released from one another. In another embodiment, the first frame section 110a may connect to a connection point, while the first adjustable section 106a can be located at a non-connecting point on the frame section 110a.

As shown in FIG. 1A, the modular eyewear system 100 can further include a second lens section 102b. It should be understood that the second lens section 102b can be different in any number of ways from the first lens section 102a. As non-limiting examples, the first lens section 102a and second lens section 102b can differ in: dimensions, optical properties, and materials. The second lens section 102b can be attached to a second frame section 110b having a second adjustable section 106b. The second adjustable section 106b can be configured so that the second lens section 102b and second frame section 110b can be reversibly attached/released from one another.

As shown in FIG. 1A, the first lens section 102a and second lens section 102b can be modular and connected with a bendable bridge 120.

Still with reference to FIG. 1A, the first adjustable section 106a, second adjustable section 106b, third adjustable section 124a, and fourth adjustable section 124b can each include a multiple-collapsible or bendable structure that forms parallel-folds-having characteristics of an "accordion" structure. Optionally, any or all of the first adjustable section 106a, second adjustable section 106b, third adjustable section 124a, and fourth adjustable section 124b can include other bendable structures. Non-limiting examples of other bendable structures include bendable/flexible metallic materials, hinges, ratchets, clamps, etc. It should also be understood that the bendable bridge 120 can include any of the structures described with reference to the first adjustable section 106a, second adjustable section 106b, third adjustable section 124a, and fourth adjustable section 124b.

Embodiments of the present disclosure can include any number of adjustable sections and frame sections. Still, with reference to FIG. 1A, the first frame section 110a can be connected to a third adjustable section 124a, and the third adjustable section 124a can also connect to a third frame section 126a. Additionally, the second frame section 110b can connect to a fourth adjustable section 124b, and the fourth adjustable section 124b can further connect to a fourth frame section 126b.

In some embodiments, any number of modular components 130 can be attached to first lens section 102a, the second lens section 102b, first frame section 110a, second frame section 110b, third frame section 126a, fourth frame section 126b, first adjustable section 106a, second adjustable section 106b, third adjustable section 124a, and fourth adjustable section 124b, bendable bridge 120, and modular component 130.

The modular device 130 can additionally include any type of sensor, input device, and/or output device. Non-limiting examples of modular devices 130 that can be used include a wireless communication module (e.g., Bluetooth, Wi-Fi, and cellular devices), cameras, speakers (e.g., earbuds), microphones, displays, lights (e.g., flashlights, LEDS, and/or LED flashlights), Optionally, the modular component(s) 130 can include a computing device (e.g., the computing device 700 illustrated in FIG. 8).

It should be understood that any/all of the components shown in FIG. 1A can be joined using any combination of attachment methods. For example, the first lens section 102a, the second lens section 102b, the first frame section 110a, the second frame section 110b, the third frame section 126a, the fourth frame section 126b, the first adjustable section 106a, the second adjustable section 106b, third adjustable section 124a, and fourth adjustable section 124b, bendable bridge 120, and modular component 130 can be joined using any combination of: male/female connectors, screws, clamps, magnets, bolts, threads, clips, other flexible connectors, etc.

As a further non-limiting example, the first lens section 102a can have a first magnet (shown in FIGS. 9A-9F), and the first adjustable section 106a can have a second magnet (shown in FIGS. 9A-9F) configured to attract the first magnet of the first lens section 102a. As yet another non-limiting example, the first adjustable section 106a can have a male or female connector that is adapted to mate to a male or female connector of the first lens section 102a (shown in FIGS. 9A-9F). Moreover, it should be understood that any/all of the components shown in FIG. 1A can be joined together using combinations of attachments. As a non-limiting example, the first lens section 102a can be joined to the first adjustable section 106a by mated male/female connectors and simultaneously by magnets of the first lens section 102a and first adjustable section 106b.

As yet another non-limiting example, embodiments of the present disclosure can include one or more latches configured to attachably and releasably connect any/all of the components shown in FIG. 1A.

In embodiments of the present disclosure that include male-female connectors, the male and/or female ends of the male/female connectors can be rubberized.

Optionally, the first lens section 102a can include a first lens frame 104a. Optionally, the second lens section 102b can include a second lens frame 104b. The present disclosure contemplates that the first lens frame 104a and the second lens frame 104b can be different.

With reference to FIGS. 1B-5, embodiments of the present disclosure can include variations of any or all of the components shown in FIG. 1A.

FIG. 1B illustrates an example embodiment of the example modular eyewear system 100 (shown as 140). The modular eyewear system 140 does not include the third adjustable section 124a shown in FIG. 1A. In the modular eyewear system 140, the first frame section 110a and third frame section 126a are directly connected.

FIG. 1C illustrates another example modular eyewear system 100 (shown as 150). In the modular eyewear system 150, the first lens section 102a and second lens section 102b are directly connected without the bendable bridge 120 described in FIG. 1A. Additionally, in the example embodiment shown in FIG. 1C, the third adjustable section and fourth adjustable section are omitted. The first frame section 110a and third frame section 126a are directly connected, and the second frame section 110b and fourth frame section 126b are directly connected.

Figure 2A:
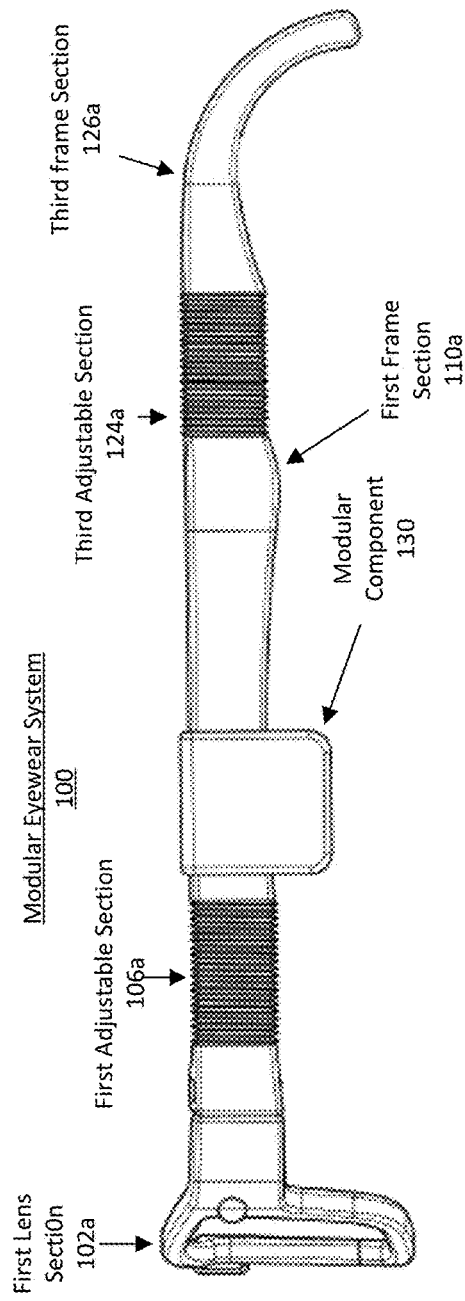
FIG. 2A is a diagram showing a side view of the example modular eyewear system shown in FIG. 1A, where the modular eyewear system is positioned in a first position, according to an illustrative embodiment.
Figure 2B:
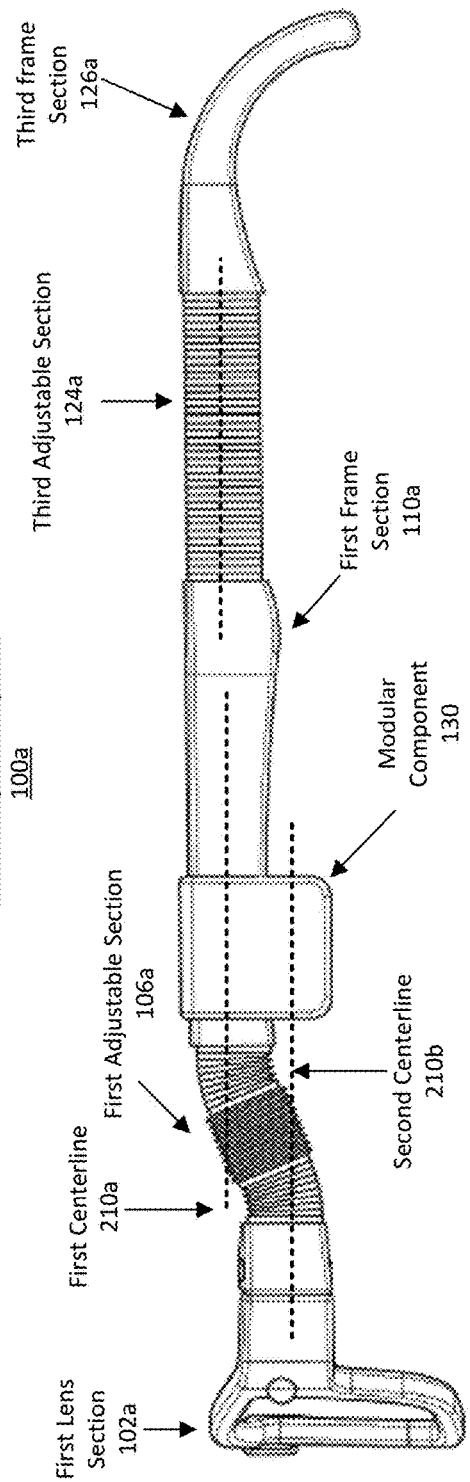
FIG. 2B is a diagram of the modular eyewear system of FIG. 2A bent into a second position, according to an illustrative embodiment.

FIGS. 2A-2B illustrate a side view of the example modular eyewear system 100 shown in FIG. 1A. FIG. 2A illustrates the modular eyewear system 100, where the first adjustable section 106a is not bent. FIG. 2B illustrates the modular eyewear system 100, where the first adjustable section 106a is bent. A first centerline 210a and a second centerline 210b illustrate how bending the first adjustable section 106a changes the position of the first lens section 102a relative to the first frame section 110a.

Figure 3A:
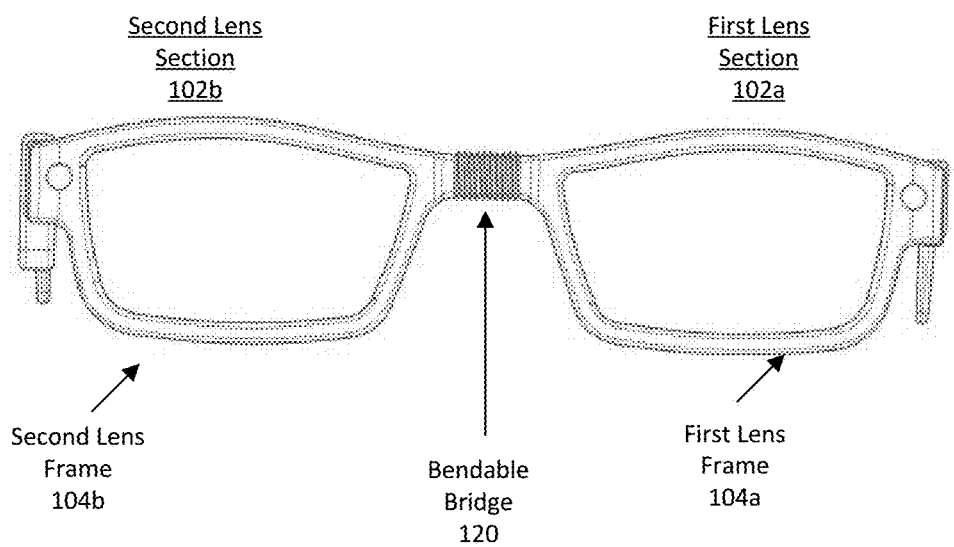
FIG. 3A illustrates a front view of the example modular eyewear illustrated in FIG. 1A.
Figure 3B:
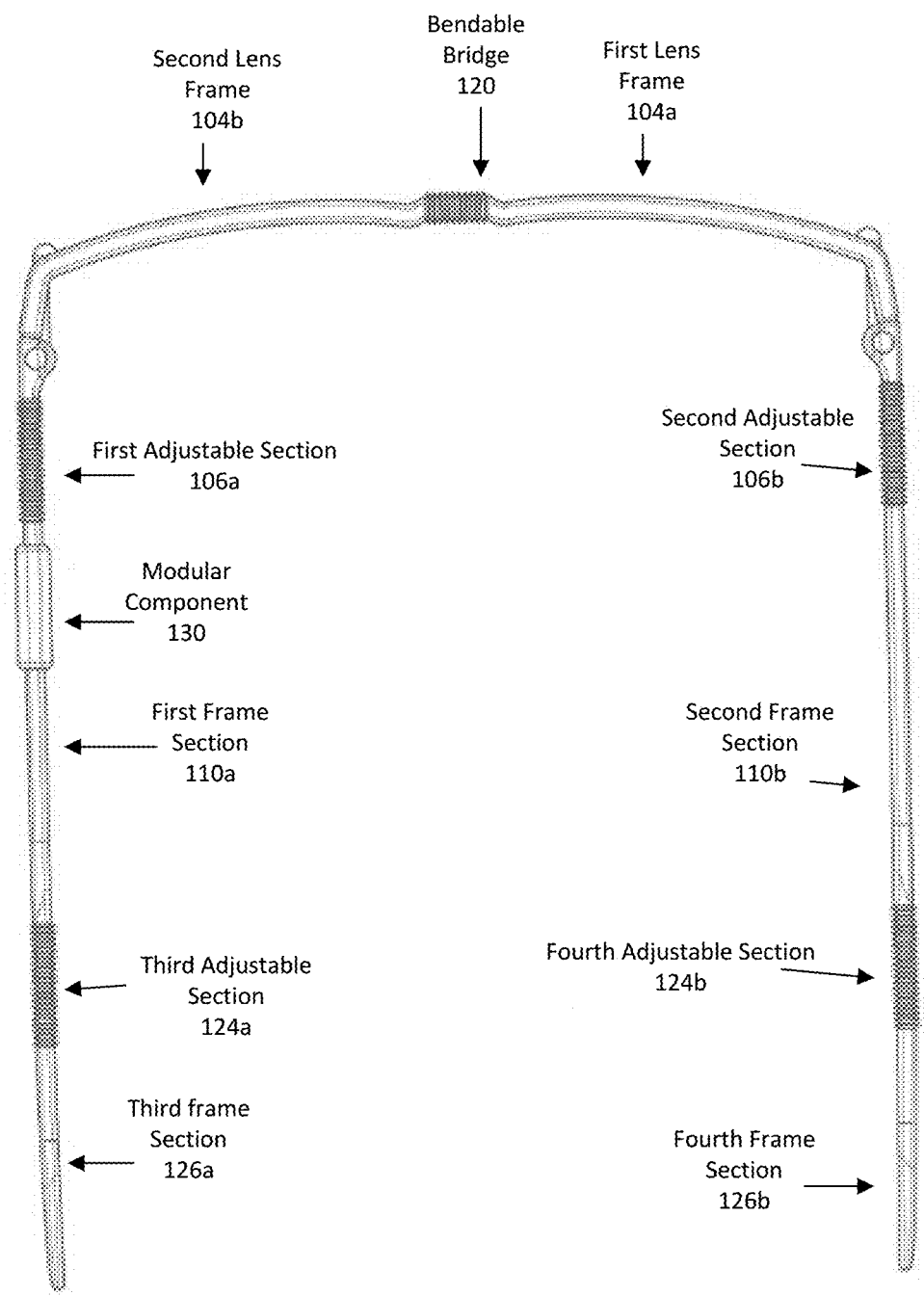
FIG. 3B illustrates a top view of the example modular eyewear illustrated in FIG. 1A.

FIG. 3A illustrates a front view of the modular eyewear system 100, shown in FIG. 1A. FIG. 3B illustrates a top view of the modular eyewear system 100, shown in FIG. 1A.

Figure 4:
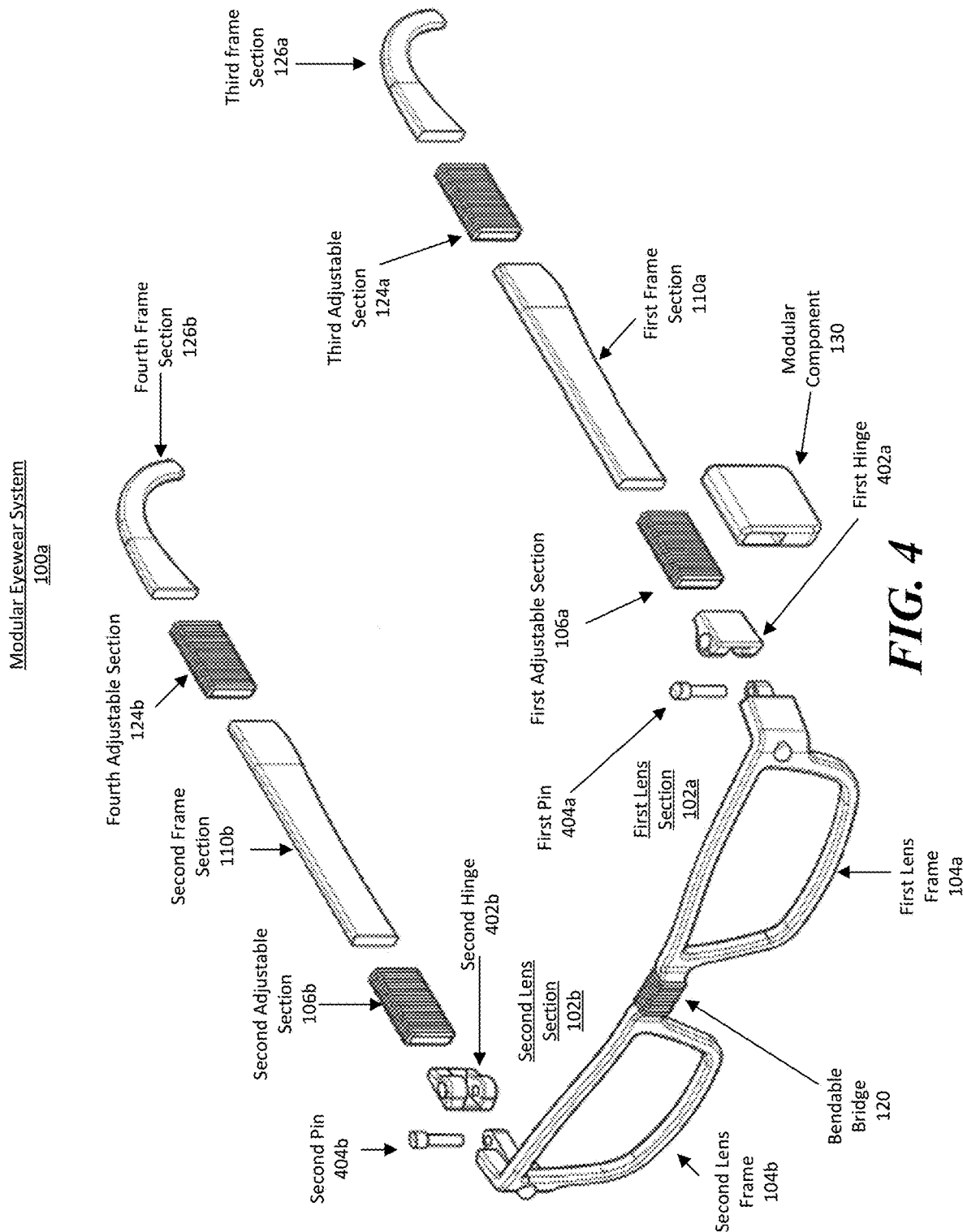
FIG. 4 illustrates an exploded view of the modular eyewear system illustrated in FIG. 1A.

FIG. 4 illustrates an exploded view of the modular eyewear system 100 shown in FIG. 1A. The modular eyewear system 100 can include a first hinge 402a and first pin 402a, which can connect the first adjustable section to the first lens section 102a.

The modular eyewear system 100 can include a second hinge 402b and second pin 404b, which can connect the second adjustable section 106b to the second lens section 102b.

Figure 5:
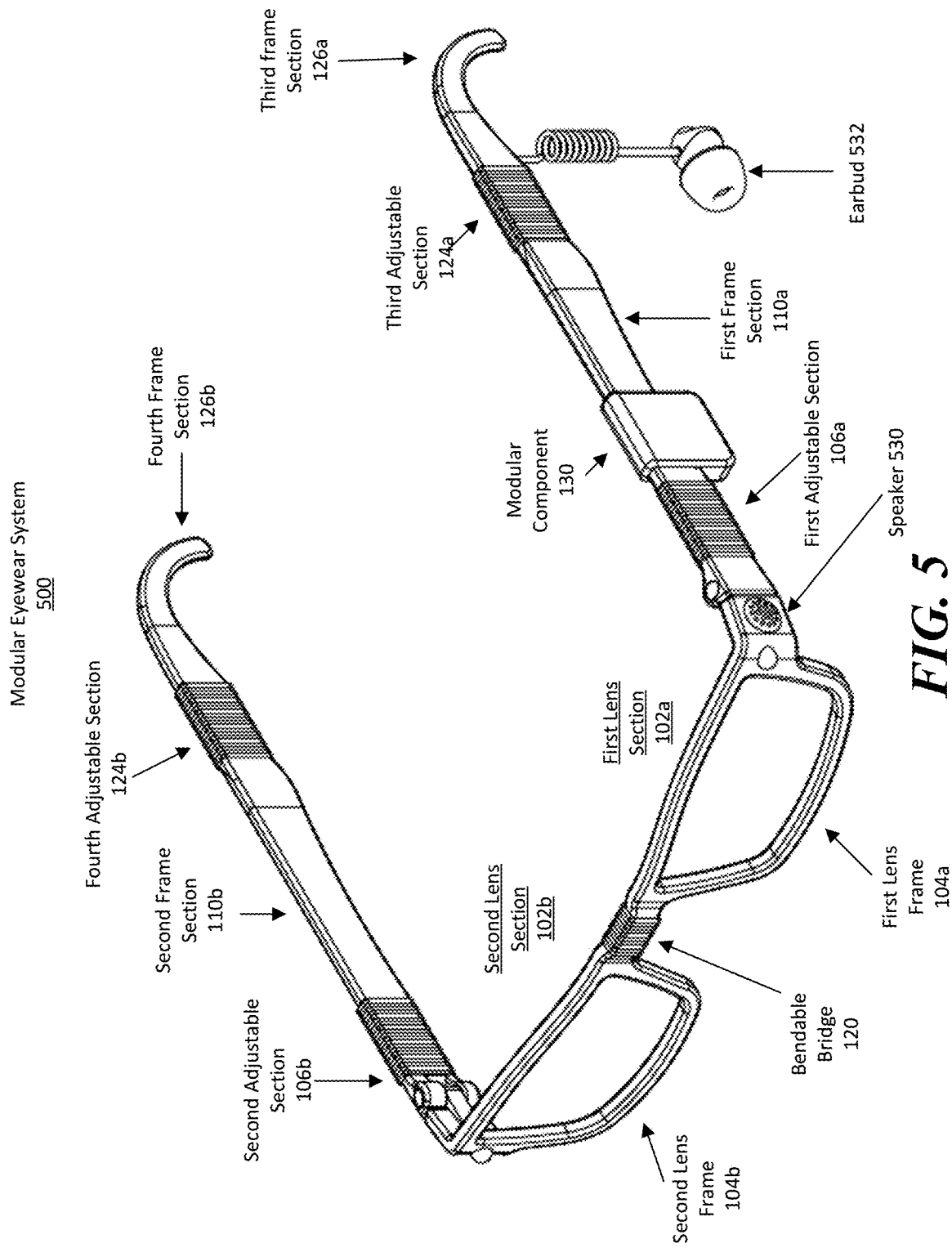
FIG. 5 illustrates a perspective view of an example modular eyewear system, in accordance with an illustrative embodiment.

FIG. 5 illustrates another example embodiment of the present disclosure. The modular eyewear system 500 shown in FIG. 5 includes additional features and components that can be used in embodiments of the present disclosure. The modular eyewear system 500 can include any or all of the components illustrated and described in FIG. 1A. Additionally, as shown in FIG. 1A, the modular eyewear system 500 can further include a speaker 530 and an earbud 532. Additionally, the modular eyewear system 500 can include any other combinations of modular components 130, as described herein.

It should be understood that the embodiments of the present disclosure shown and described with reference to FIGS. 1A-5 can optionally be created by adding/removing modular components from the modular eyewear systems 100, 140, 150, and 500 shown and described with reference to FIGS. 1A-5. As a non-limiting example, the speaker 530 and earbud 532 can be modular and attachable/removable so that the speaker 530 and earbud 532 can be added to the modular eyewear system 100 shown in FIG. 1A to create the modular eyewear system 500 shown in FIG. 5.

With reference to FIG. 6A-6B, embodiments of the present disclosure also include method 600 for operating modular eyewear systems.

At step 602 the method 600 can include providing a first lens, a first adjustable section attachably and releasably connected to the lens, and a first frame section attachably and releasably connected to the adjustable section. Optionally, the method can further include providing any or all of the various embodiments of the present disclosure illustrated with reference to FIGS. 1A-5.

At step 604, the method 600 can include releasing the first lens from the first adjustable section. Releasing the first lens from the first adjustable section can include reversing any of the attachments described with reference to FIGS. 1A-5. As a non-limiting example, releasing the first lens from the first adjustable section can include pulling apart the magnets of the first lens and the first adjustable section. As additional non-limiting examples, releasing the first lens from the first adjustable section can include releasing a male/female connector, or releasing a latch.

At step 606 the method 600 can include attaching a second lens to the first adjustable section. The second lens can be attached to the first adjustable section in the same way that the first lens was attached to the first adjustable section or in a different way. For example, the second lens can be attached by latching a latch, placing two magnets adjacent to each other, or connecting a male/female connector.

Optionally, the method 600 can further include providing a bendable bridge like the bendable bridge 120 illustrated with reference to FIGS. 1A-1B, 3A, 3B, 4, and 5. The bendable bridge can attach the first and second lenses together. Alternatively or additionally, the bendable bridge can attach a third lens to the first lens.

Optionally, the method can further include attaching a attaching a modular component to any component of the modular eyewear (e.g., to the first lens, second lens, third lens, first frame section, bendable bridge, etc.). In some embodiments, more than one modular component can be attached. The modular component can include any/all of the devices/features described with reference to FIG. 1A.

With reference to FIG. 6B, embodiments of the present disclosure include methods of adapting modular eyewear systems (e.g., the modular eyewear system 100 shown in FIG. 1A) to a face of a user. At step 632, the method 630 shown in FIG. 6B can include providing a first lens, a first adjustable section attachably and releasably connected to the lens; and a first frame section attachably and releasably connected to the adjustable section. The components provided at step 632 can further include any/all of the components described herein.

At step 634, the method 630 can further include determining a desired position of the first lens and first frame section relative to a body part of a person.

At step 636, the method can further include bending the first adjustable section so that the first lens and the first frame section are in the desired position relative to the body part of the person. FIGS. 2A and 2B show an example side view of a modular eyewear system 100 where the first adjustable section 106a has been bent.

Example System #2

FIGS. 9A-9F show perspective views of various configurations of an exemplary modular eyewear system, in accordance with an illustrative embodiment.

Figure 9A:
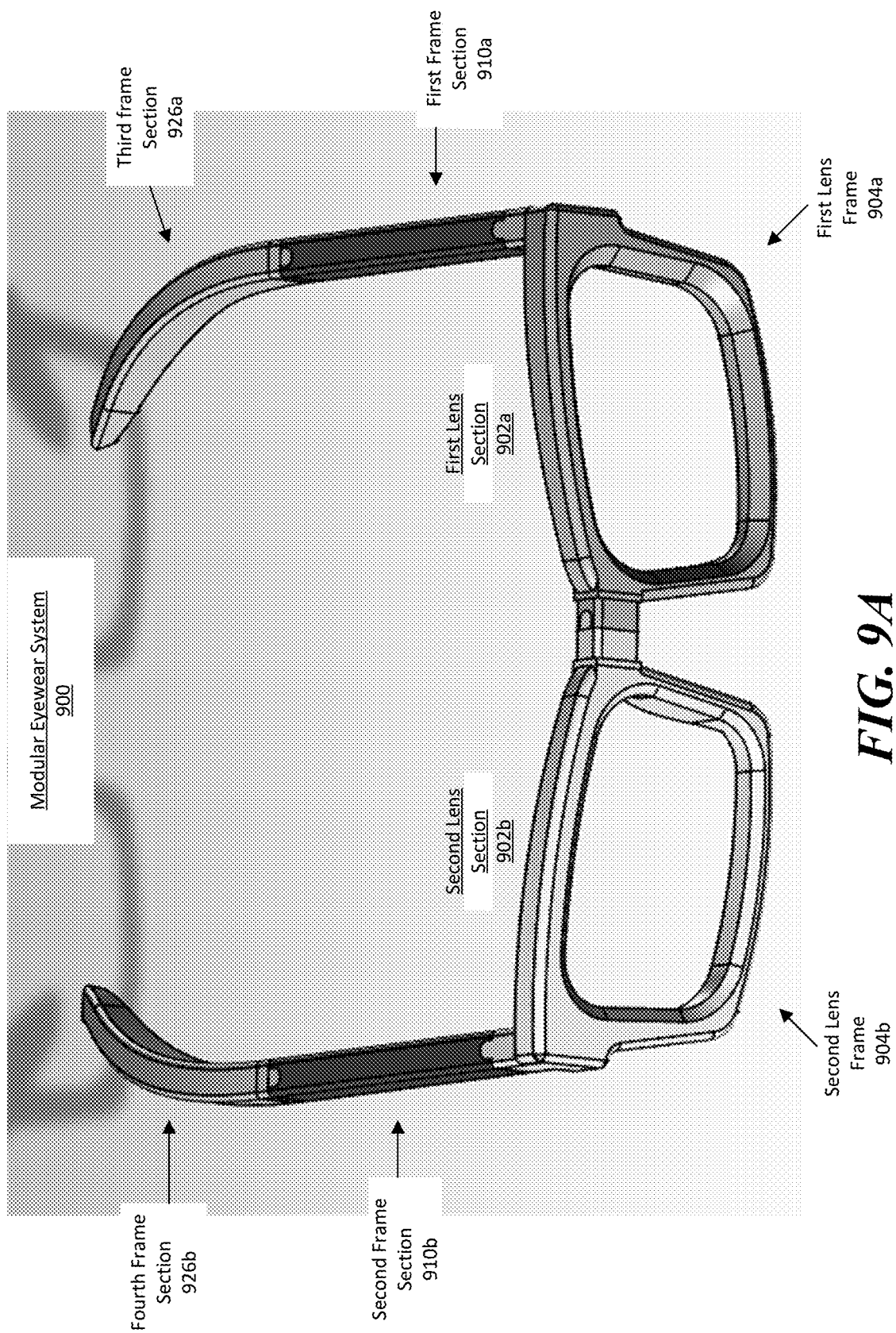
FIGS. 9A-9F show another example modular eyewear system and modular components thereof in accordance with an illustrative embodiment.

FIG. 9A is a diagram showing a perspective view of an example modular eyewear system 900. The example modular eyewear system 900 includes a first lens 902a comprising a first lens frame 904a. The first lens frame 904a can be connected to a first frame section 910a. The connection point between the first lens frame 904a and the first frame section 910a is configured so that the first lens frame 904a and first frame section 910a can be reversibly attached/released from one another.

As shown in FIG. 9A, the modular eyewear system 900 can further include a second lens 902b. It should be understood that the second lens 902b can be different in any number of ways from the first lens 902a. As non-limiting examples, the first lens 902a and second lens 902b can differ in: dimensions, optical properties, and materials. The second lens 902b comprises a second lens frame 904b. The second lens frame 904b is connected to the first lens frame 904a. The second lens frame 904b is also connected to a second frame section 910b. The connection point between the second lens frame 904b and the second frame section 910b, as well as between the second lens frame 904b and the first lens frame 904a, is configured so that the second lens frame 904b and the second frame section 910b and/or the first lens frame 904a can be reversibly attached/released from one another.

As shown in FIG. 9A, the modular eyewear system 900 further includes a third frame section 926a connected to the first frame section 910a. The modular eyewear system 900 further includes a fourth frame section 926b connected to the second frame section 910b. Each of the third frame section 926a and the fourth frame section 926b are reversibly attachable to their respective frame sections 910a, 910b in a similar manner as the other elements of the modular eyewear system 900.

Figure 9C:
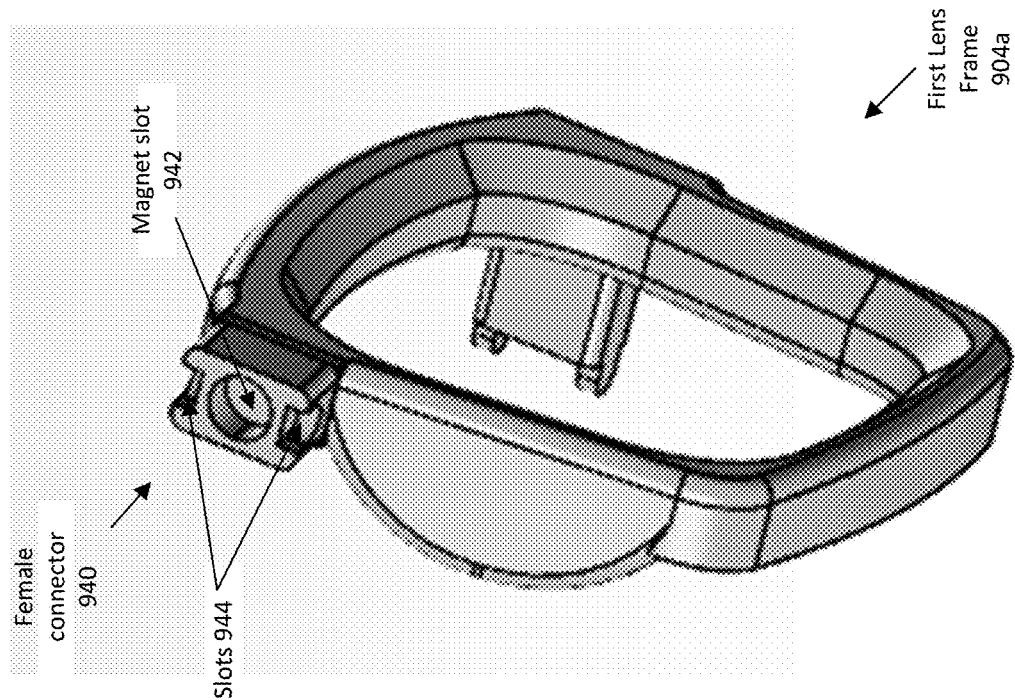
Figure 9B:
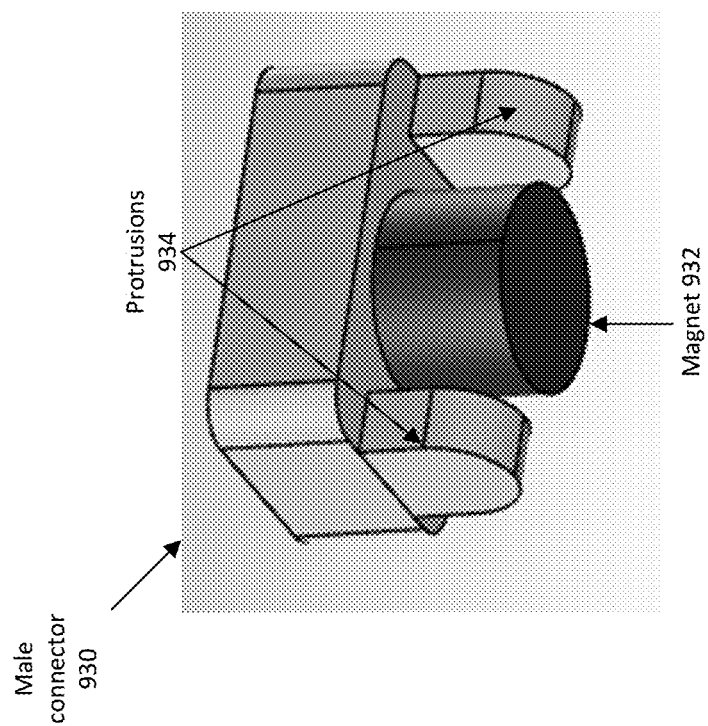

FIG. 9B shows an example mechanism for connecting various components of the modular eyewear system 900. More specifically, FIG. 9B shows a male connector 930, including a magnet 932 (e.g., a rubberized magnetic rod) and two protrusions 934. The male connector 930 is configured to connect to a female connector, as shown in FIG. 9C as female connector 940. Female connector 940 is disposed on a first lens frame 904a and includes a magnet slot 942 configured to receive the magnet 932. The female connector 940 further includes two slots 944 configured to receive the protrusions 934. The female connector 940 also includes a corresponding magnetic element (not shown) within the frame to connect to the magnet 932 (e.g., another magnet or a small piece of ferromagnetic metal).

Figure 9D:
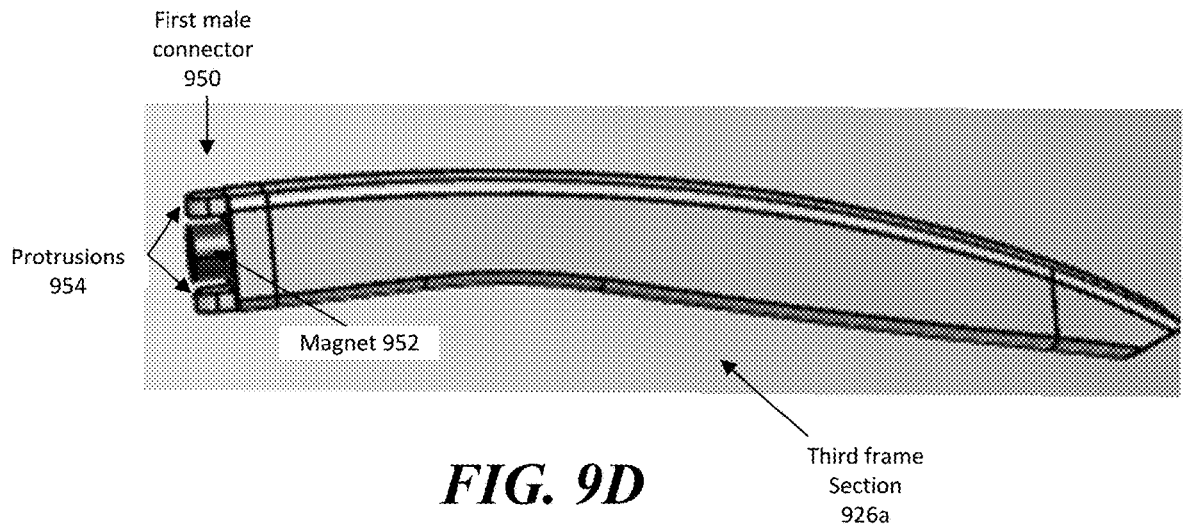
Figure 9E:
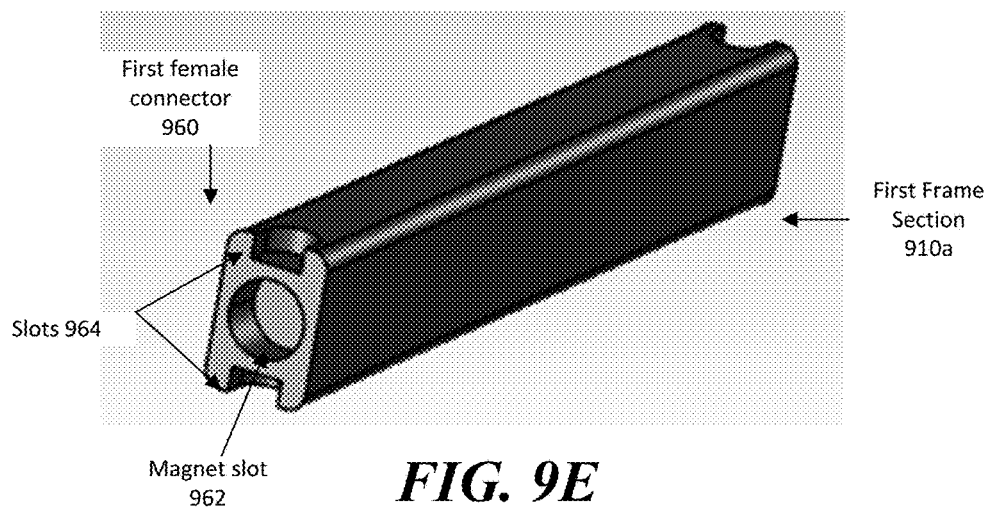
Figure 9F:
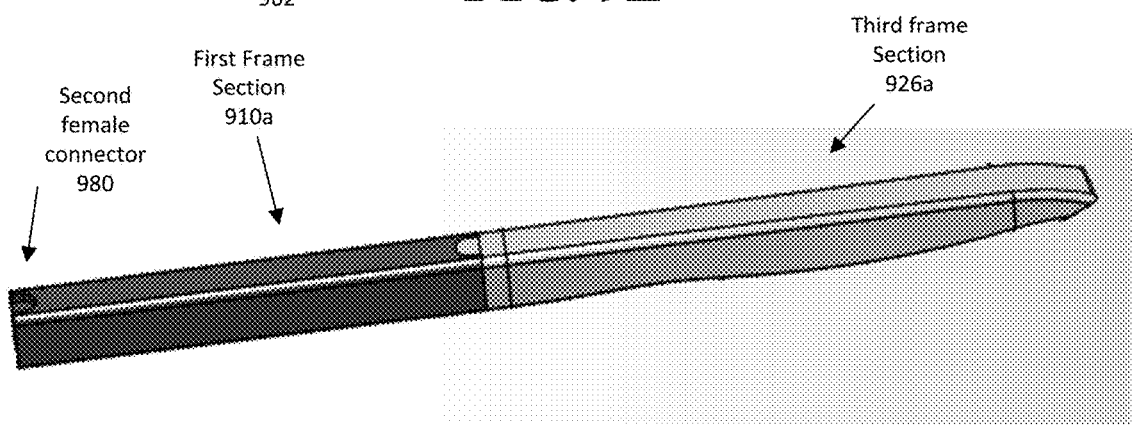

As another example, FIGS. 9D-9F show an example of the magnetic connectors of the modular eyewear system 900 with a focus on the frame sections. FIG. 9D shows the third frame section 926a, including a first male connector 950. FIG. 9E shows the first frame section 910a, including a first female connector 960. Similar to FIGS. 9B-9C, the first male connector 950 includes a magnet 952 and protrusions 954, and the first female connector 960 includes a magnet slot 962 and slots 964 for accepting the corresponding elements of the first male connector 950. The first female connector 960 of the first frame section 910a also includes a corresponding magnetic element within the frame (not shown) to connect to the magnet 952.

The first frame section 910a and the third frame section 926a connect with the use of the magnet 952 and the corresponding magnetic element to form a rigid structure, as shown in FIG. 9F. In this way, a variety of different third frame sections 926a may be connected to a variety of different first frame sections 910a. In some implementations, the two frame pieces may have different geometry or material characteristics. The modular nature of the modular eyewear system 900 leaves open a wide range of options.

Furthermore, note that the first frame section 910a includes a second female connector 980 disposed on an opposite end from the first female connector 960. The second female connector 980 can connect to other eyewear elements, for example, the first lens frame 904a, as shown in FIG. 9A.

Example Attachment Surfaces

As described with reference to FIGS. 1A-6A, modular eyewear described herein can be configured using magnets. In some embodiments, some of the modular eyewear components can include magnets and/or ferromagnetic materials that can be attracted by magnets in other modular eyewear components. The magnets in any/all of the modular eyewear components can optionally be configured as "attachment surfaces." Additionally, in some embodiments, a component of the modular eyewear can include two attachment surfaces, where a magnet is on one attachment surface, and a ferromagnetic material is on the other attachment surface.

Additionally, in some embodiments, the attachment surfaces can include mechanical fasteners, including straps, buckles, buttons, clips, hook-and-loop, and bolts or screws. The mechanical fasteners can be used as an alternative to magnets and ferromagnetic materials, or the mechanical fasteners can be used in addition to the magnets and ferromagnetic materials.

Magnets can be characterized as having a "pull strength" where the pull strength of the magnet is the highest possible holding power of the magnet. The pull strength can be measured in kilograms or any other units of mass. Another property of magnets is the magnetic pull force, where the pull force can be represented as $F=m*a$. Pull force can be tested by testing the holding force of a magnet that is in contact with a flat steel plate.

The strength of a magnet can be affected by the size and shape of the magnet, as well as temperature, environmental conditions, the material being attracted. Non-limiting examples of material properties that can affect the magnet's strength include size, quality, shape, and permeability.

Another property of the magnets that can be used in embodiments of the present disclosure is the maximum energy product of the magnets. A higher maximum energy product value can correspond to a greater magnetic field in a particular application.

Another property that can be used to characterize the magnets described herein is the pull-gap curve. The pull-gap curve represents the pull force or pull strength at different air gap distances, where the air gap distance represents the space between two surfaces that are magnetically attracted to one another.

As a non-limiting example, a pair of S-15-08-N disc magnets with a 15 mm diameter, 8 mm height was considered. The magnetization for each magnet was N42, and the magnets were considered to be 0 mm apart (i.e., in contact with one another). The adhesive force of the two magnets was approximately 6.2 kilograms.

Figure 7B:
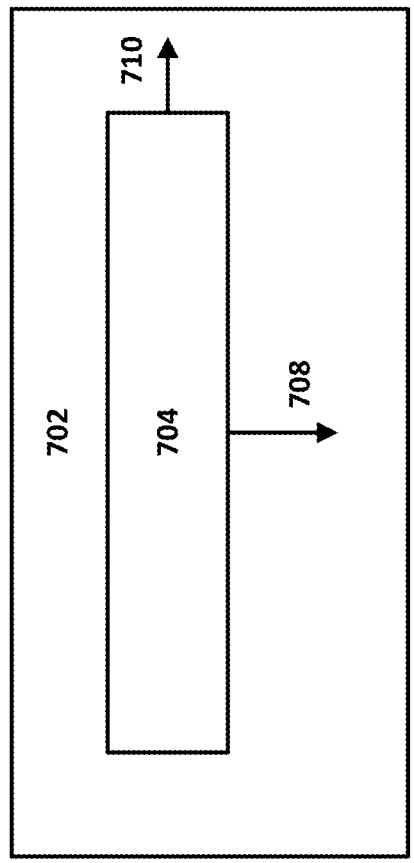
FIGS. 7A and 7B each illustrates an example configurations for the magnets of the modular eyewear system.
Figure 7A:
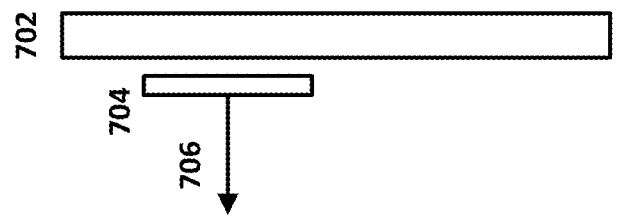

In embodiments including a magnetic tape or magnetic sheets, the adhesive force and holding strength of the magnetic tape or sheet can be measured. The adhesive force and holding strength can be given in grams per square centimeter ($g/cm^2$). As used herein, magnetic adhesive force of a magnetic tape or magnetic sheet can represent the needed strength for separating the magnetic tape from a steel plate. FIG. 7A illustrates a steel plate 702 and magnetic tape 704, where the direction of the separation during the measurement of the magnetic adhesive force is shown with an arrow 706.

Holding strength diagonal can be measured as the strain that happens when the magnetic tape is used to hang an object from the vertical surface of a steel plate 702. As shown in FIG. 7B, the holding strength diagonal is represented by the force 708 pulling the magnetic tape 704 down. Holding strength parallel can be measured as the force required to slide the piece of magnetic tape 704 is slid along the metal plate 702. The force of holding strength parallel is represented by arrow 710 in FIG. 7B.

As some non-limiting examples, a pair of neodymium magnetic adhesive tapes joined together can have a magnetic adhesive force of 675 $g/cm^2$, a holding strength diagonal of 360 $g/cm^2$, and a holding strength parallel of 180 $g/cm^2$. A neodymium magnetic adhesive tape on an iron surface can have a magnetic adhesive force of 450 $g/cm^2$, a holding strength diagonal of 112 $g/cm^2$, and a holding strength parallel of 112 $g/cm^2$.

It should be understood that the magnets described herein can be any magnet and are not limited to the sizes and types of magnets described herein.

Figure 8:
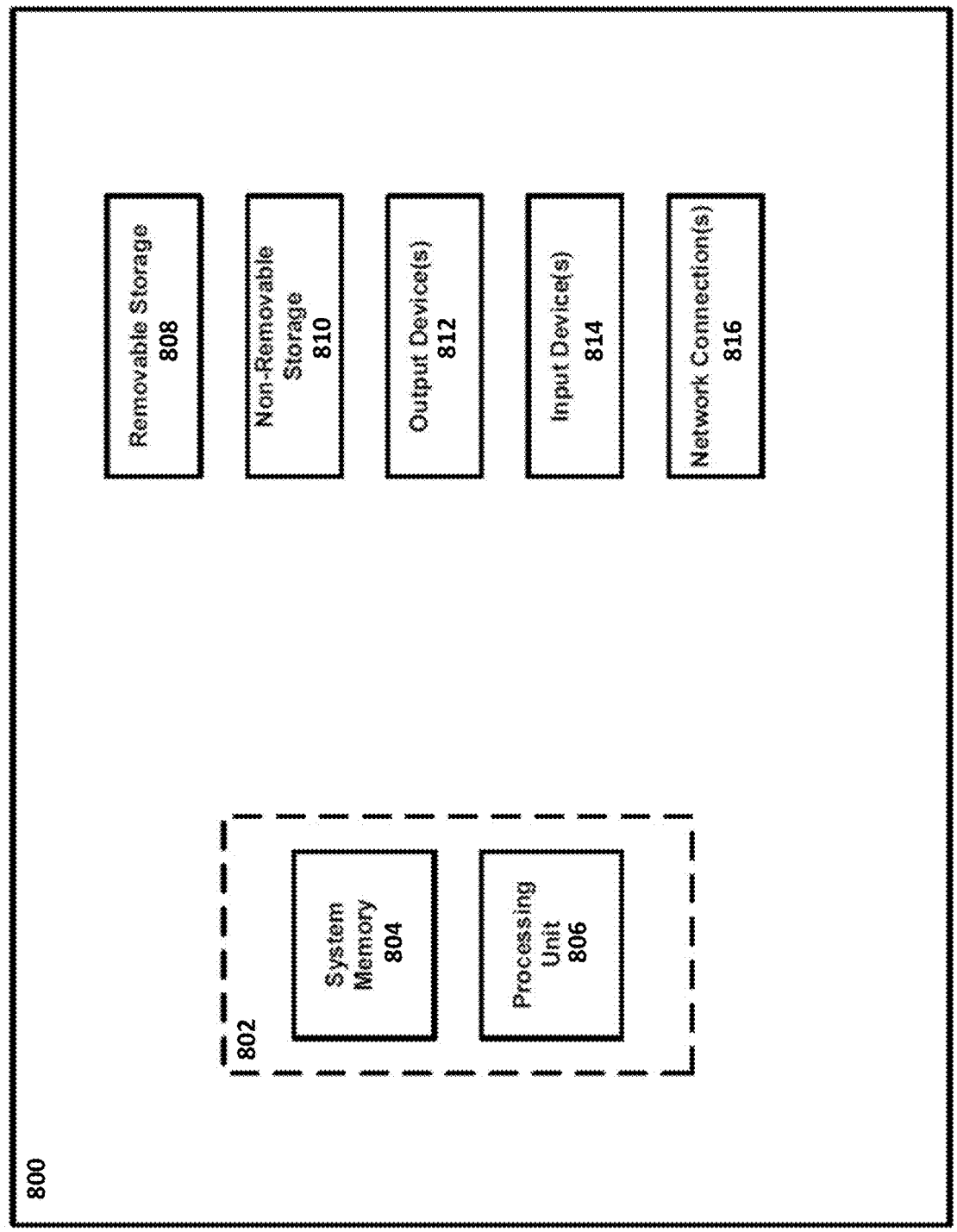
FIG. 8 illustrates an example computing device.

Referring to FIG. 8, an example computing device 800 upon which the methods described herein may be implemented is illustrated. It should be understood that the example computing device 800 is only one example of a suitable computing environment upon which the methods described herein may be implemented. Optionally, the computing device 800 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 800 typically includes at least one processing unit 806 and system memory 804. Depending on the exact configuration and type of computing device, system memory 804 may be volatile (such as random access memory (RAM)), non-volatile (such as read-only memory (ROM), flash memory, etc.), or some combination of the two. This most basic configuration is illustrated in FIG. 14 by dashed line 802. The processing unit 806 may be a standard programmable processor that performs arithmetic and logic operations necessary for operation of the computing device 800. The computing device 800 may also include a bus or other communication mechanism for communicating information among various components of the computing device 800.

Computing device 800 may have additional features/functionality. For example, computing device 800 may include additional storage such as removable storage 808 and non-removable storage 810, including, but not limited to, magnetic or optical disks or tapes. Computing device 800 may also contain network connection(s) 816 that allow the device to communicate with other devices. Computing device 800 may also have input device(s) 814, such as a keyboard, mouse, touch screen, etc. Output device(s) 812, such as a display, speakers, printer, etc., may also be included. The additional devices may be connected to the bus in order to facilitate the communication of data among the components of the computing device 800. All these devices are well-known in the art and need not be discussed at length here.

The processing unit 806 may be configured to execute program code encoded in tangible, computer-readable media. Tangible, computer-readable media refers to any media that is capable of providing data that causes the computing device 800 (i.e., a machine) to operate in a particular fashion. Various computer-readable media may be utilized to provide instructions to the processing unit 806 for execution. Example of tangible, computer-readable media may include, but is not limited to, volatile media, non-volatile media, removable media, and non-removable media implemented in any method or technology for storage of information such as computer-readable instructions, data structures, program modules, or other data. System memory 804, removable storage 808, and non-removable storage 810 are all examples of tangible computer storage media. Examples of tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 806 may execute program code stored in the system memory 804. For example, the bus may carry data to the system memory 804, from which the processing unit 806 receives and executes instructions. The data received by the system memory 804 may optionally be stored on the removable storage 808 or the non-removable storage 810 before or after execution by the processing unit 806.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and it may be combined with hardware implementations.

While the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered limited only by the spirit and scope of the disclosure (and claims), including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive.

It should be appreciated that various sizes, dimensions, contours, rigidity, shapes, flexibility, and materials of any of the components or portions of components in the various embodiments discussed throughout may be varied and utilized as desired or required.

It should be appreciated that while some dimensions are provided on the aforementioned figures, the device may constitute various sizes, dimensions, contours, rigidity, shapes, flexibility, and materials as it pertains to the components or portions of components of the device, and therefore may be varied and utilized as desired or required.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the disclosure, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particular interrelationship of such elements. Accordingly, the descriptions and drawings are to be regarded as illustrative in nature and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States/foreign patent, United States/foreign patent application, book, article, etc.) that has been incorporated by reference herein is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

What is claimed is:

1. A modular eyewear system, the system comprising:
a first lens section having a first end, wherein the first lens section includes, at a second end, a second lens or a second lens section having the second lens; and
a first temple frame section designed to extend along a temple and side of a person face to have a terminated end to rest along an ear region of the person, the first temple frame section having a first adjustable section at its first end to attachably and releasably couple to the first end of the first lens section, the first adjustable section having a multiple-collapsible or bendable structure configured to move between a plurality of configurations, including (i) a first configuration that rests the terminated end along a first ear region of the person and (ii) a second configuration that rests the terminated end along a second ear region.

2. The modular eyewear system of claim 1, wherein the multiple-collapsible or bendable structure of the first adjustable section forms a parallel-folds-accordion structure.

3. The modular eyewear system of claim 1, wherein the multiple-collapsible or bendable structure of the first adjustable section forms a bendable structure.

4. The modular eyewear system of claim 1, wherein the multiple-collapsible or bendable structure is configured as a male connector or female connector to attachably and releasably couple to a corresponding pair connector located on the first end of the first lens section.

5. The modular eyewear system of claim 4, wherein the male connector comprises a rubberized magnetic rod, and the female connector comprises a slot sized to receive the rubberized magnetic rod.

6. The modular eyewear system of claim 4, wherein the male connector comprises a magnetic rod, and the female connector comprises a slot sized to receive the magnetic rod.

7. The modular eyewear system of claim 1, wherein the multiple-collapsible or bendable structure of the first adjustable section is formed of a pliable material.

8. The modular eyewear system of claim 1, wherein the first adjustable section comprises one or more magnets.

9. The modular eyewear system of claim 1, further comprising:
a second temple frame section designed to extend along the other temple and side of the person face to have a second terminated end to rest along an ear region of the second ear of the person, the second temple frame section having a second adjustable section at its first end to attachably and releasably couple to the second end of the first lens section, wherein the second end of the first lens section includes the second lens and associated frame, wherein the second adjustable section has a multiple-collapsible or bendable structure configured to move between a plurality of configurations, including (i) a third configuration that rests the second terminated end along a first ear region at the second ear of the person and (ii) a fourth configuration that rests the second terminated end along a second ear region at the second ear of the person.

10. The modular eyewear system of claim 1, further comprising:
a second temple frame section designed to extend along the other temple and side of the person face to have a second terminated end to rest along an ear region of the second ear of the person, the second temple frame section having a second adjustable section at its first end to attachably and releasably couple to a first end of a second lens section, wherein the second lens section includes the second lens and associated frame, wherein the second adjustable section has a multiple collapsible or bendable connection configured to move between a plurality of configurations, including (i) a third configuration that rests the second terminated end along a first ear region at the second ear of the person and (ii) a fourth configuration that rests the second terminated end along a second ear region at the second ear of the person.

11. The modular eyewear system of claim 10, wherein the first lens section and the second lens section include a corresponding pair of multiple collapsible or bendable connections.

12. The modular eyewear system of claim 1, wherein a first optical property of the first lens is different than a second optical property of the second lens.

13. The modular eyewear system of claim 1, wherein the first temple frame section and the second temple section has a same mass though different in color or shape.

14. The modular eyewear system of claim 1, wherein the first lens further comprises a first lens frame and the second lens further comprises a second lens frame, wherein the first lens frame and the second lens frame are different.

15. The modular eyewear system of claim 1, wherein the first temple frame section comprises a sensor, an earbud, a speaker, an LED light, and/or a communications module.

16. The modular eyewear system of claim 1, further comprising:
the second lens section having a first end, wherein the second lens section comprises a frame for the second lens, and wherein the second lens section includes a connector to couple to the first lens section at the nose bridge.

17. The modular eyewear system of claim 1, wherein the first adjustable section is configured to releasably and attachably couple to the first lens section.

18. The modular eyewear system of claim 1, wherein first temple section includes a region that extends from the first adjustable section to releasably and attachably couple to the first lens section.

19. The modular eyewear system of claim 1, wherein the first adjustable section comprises a male or female connector to attachably and releasably couple to a corresponding pair connector located on the first end of the first lens section and wherein the at least one of the first temple section and the corresponding pair connector comprise a magnet.

20. A method of operating a modular eyewear system, the method comprising: providing (i) a first lens section having a first end, wherein the first lens section
includes, at a second end, a second lens or a second lens section having the second lens and (ii) a first temple frame section connected to the first lens section and is designed to extend along a temple and side of a person face to have a terminated end to rest along an ear region of the person, the first temple frame section having a first adjustable section at its first end to attachably and releasably couple to the first end of the first lens section, the first adjustable section having a multiple-collapsible or bendable structure configured to move between a plurality of configurations, including (i) a first configuration that rests the terminated end along a first ear region of the person and (ii) a second configuration that rests the terminated end along a second ear region;
releasing the first lens section, at its first end, from the first temple frame section; and
attaching the first lens section, at its first end, to a third temple frame section, wherein the third temple frame section is designed to extend along a temple and side of a person face to have a terminated end to rest along an ear region of the person, the third temple frame section having a third adjustable section at its first end to attachably and releasably couple to the first end of the first lens section, the third adjustable section having a multiple-collapsible or bendable structure configured to move between a plurality of configurations, including (i) a first configuration that rests the terminated end along a first ear region of the person and (ii) a second configuration that rests the terminated end along a second ear region.

21. A method of fitting a modular eyewear system to a person, the method comprising: providing (i) a first lens section having a first end, wherein the first lens section
   includes, at a second end, a second lens or a second lens section having the second lens and (ii) a first temple frame section connected to the first lens section and is designed to extend along a temple and side of a person face to have a terminated end to rest along an ear region of the person, the first temple frame section having a first adjustable section at its first end to attachably and releasably couple to the first end of the first lens section, the first adjustable section having a multiple-collapsible or bendable structure configured to move between a plurality of configurations, including (i) a first configuration that rests the terminated end along a first ear region of the person and (ii) a second configuration that rests the terminated end along a second ear region;
   determining a desired position of the first lens section and the first temple frame section relative to a nose region and the first ear region of the person; and
   adjusting the first adjustable section at the multiple-collapsible or bendable structure to the desired position relative to the body part of the person.

22. A modular eyewear system, the system comprising:
   a first lens section having a first end, wherein the first lens section includes, at a second end, a second lens or a second lens section having the second lens; and
   a first temple frame section designed to extend along a temple of a person and side of a person face to have a terminated end to rest along an ear region of the person, the first temple frame section having a connection assembly at its first end to attachably and releasably couple to the first end of the first lens section, wherein at least one of the connection assembly of the first temple frame section or the first lens section comprises a male connector to attachably and releasably couple to a corresponding pair female connector located on the first end of the first lens section or the first temple frame section, wherein the male connector comprises (i) a first protrusion, (ii) a second protrusion, and (iii) a magnet protrusion comprising a magnet located between the first protrusion and the second protrusion, and wherein the female connector comprises (i) a first slot configured to receive the first protrusion, (ii) a second slot configured to receive the second protrusion, and (iii) a magnet slot configured to receive the magnet protrusion comprising a second magnet or a ferromagnetic material.

23. The modular eyewear system of claim 22, the first temple frame section comprises a second end opposite the first end, the second end of the first temple frame section having a second connection assembly configured to attachably and releasably couple a first ear frame section designed to extend to have a terminated end to rest along an ear region of the person, wherein the ear frame section comprises a third connection assembly.

24. The modular eyewear system of claim 22, wherein the first temple frame section comprises an adjustable section.

25. The modular eyewear system of claim 24, wherein the adjustable section comprises one or more magnets.

\* \* \* \* \*